(12) United States Patent
Westerweck et al.

(10) Patent No.: US 7,773,876 B2
(45) Date of Patent: Aug. 10, 2010

(54) CAMERA MODULE CONTAMINATION REDUCTION GASKET

(75) Inventors: Lothar R. Westerweck, San Jose, CA (US); Albert John Y. Chua, San Jose, CA (US); Bahram Afshari, Los Altos, CA (US)

(73) Assignee: Flextronics AP LLC, Broomfield, CO (US)

( * ) Notice: Subject to any disclaimer, the term of this patent is extended or adjusted under 35 U.S.C. 154(b) by 344 days.

(21) Appl. No.: 11/982,846

(22) Filed: Nov. 5, 2007

(65) Prior Publication Data
US 2008/0159734 A1    Jul. 3, 2008

Related U.S. Application Data

(60) Provisional application No. 60/864,348, filed on Nov. 3, 2006.

(51) Int. Cl.
*G03B 17/00* (2006.01)
*G03B 17/02* (2006.01)
(52) U.S. Cl. .......................... 396/535; 396/79
(58) Field of Classification Search ................. 396/73, 396/79, 439, 535
See application file for complete search history.

(56) References Cited

U.S. PATENT DOCUMENTS

| | | | | |
|---|---|---|---|---|
| 6,011,661 | A | 1/2000 | Weng | 359/819 |
| 6,359,740 | B1 | 3/2002 | Tsuchiya | 359/819 |
| 6,426,839 | B2 | 7/2002 | Dou et al. | 359/823 |
| 6,555,812 | B1 | 4/2003 | Bohn | 250/239 |
| 6,590,720 | B2 | 7/2003 | Oba | 359/819 |
| 2005/0185088 | A1 | 8/2005 | Kale et al. | 348/374 |
| 2005/0248684 | A1 | 11/2005 | Machida | 348/373 |
| 2005/0285973 | A1 | 12/2005 | Singh et al. | 348/374 |
| 2006/0103953 | A1 | 5/2006 | Lee et al. | 359/819 |
| 2006/0170811 | A1 | 8/2006 | Joung | 348/342 |
| 2006/0193064 | A1 | 8/2006 | Kim | 359/811 |

(Continued)

FOREIGN PATENT DOCUMENTS

WO    WO 2008/057517    5/2008

(Continued)

OTHER PUBLICATIONS

PCT Application No. PCT/US 2007/023335, International Search Report and Written Opinion dated Mar. 12, 2008.

(Continued)

*Primary Examiner*—Rodney E Fuller
(74) *Attorney, Agent, or Firm*—Henneman & Associates, PLC; Larry E. Henneman, Jr.

(57) ABSTRACT

A novel digital camera module includes an image capture device, a lens unit, a housing including an opening for receiving the lens unit and positioning the lens unit with respect to the image capture device, and a boot coupled the lens unit and the housing. In a particular embodiment, the boot includes an upper end and a lower end, each of which has a different outer perimeter. In another particular embodiment, a portion of the inner surface of the boot remains free of contact from the outer surface of the lens unit. In another particular embodiment, the lower end of the boot extends beyond the lower end of the lens unit.

38 Claims, 7 Drawing Sheets

U.S. PATENT DOCUMENTS

| | | |
|---|---|---|
| 2007/0008631 A1 | 1/2007 | Webster et al. .............. 359/819 |
| 2007/0077051 A1* | 4/2007 | Toor et al. ................... 396/144 |
| 2008/0152339 A1 | 6/2008 | Westerweck et al. ........ 396/541 |

FOREIGN PATENT DOCUMENTS

| | | |
|---|---|---|
| WO | WO 2008/057544 | 5/2008 |

OTHER PUBLICATIONS

PCT Application No. PCT/US 2007/023335, International Preliminary Report on Patentability dated May 14, 2009.

PCT Application No. PCT/US 2007/023388, International Search Report and Written Opinion dated Apr. 3, 2008.

PCT Application No. PCT/US 2007/023388, International Preliminary Report on Patentability dated May 14, 2009.

* cited by examiner

CAMERA MODULE CONTAMINATION REDUCTION GASKET

RELATED APPLICATIONS

This application claims the benefit of prior U.S. Provisional Patent Application Ser. No. 60/864,348, filed on Nov. 3, 2006 by at least one common inventor, which is incorporated herein by reference in its entirety.

BACKGROUND OF THE INVENTION

1. Field of the Invention

The present invention relates generally to electronic devices, and more particularly to digital camera modules. Even more particularly, the present invention relates to a system for focusing a digital camera module that prevents debris and particulate matter produced by the focusing process from contaminating the sensor array of an image capture device.

2. Description of the Background Art

Digital camera modules are currently being incorporated into a variety of electronic devices. Such camera hosting devices include, but are not limited to, cellular telephones, personal data assistants (PDAs), and computers. The demand for digital camera modules continues to grow as the ability to incorporate the camera modules into host devices expands. Therefore, one design goal of digital camera modules is to make them as small as possible so that they will fit into an electronic device without substantially increasing the overall size of the device. Means for achieving this goal must, of course, preserve the quality of the image captured by the camera modules.

Such digital camera modules typically include a substrate, an image capture device, a housing, and a lens unit. The substrate is typically a printed circuit board (PCB) that includes circuitry to facilitate data exchange between the image capture device and the host device. The image capture device is mounted and electrically coupled to the circuitry of the PCB. The housing is then mounted on the PCB over the image capture device. The housing includes an opening that receives and centers the lens unit with respect the image capture device. Typically, the opening includes a set of threads and the lens unit includes a complementary set of threads that facilitate the factory focusing of the camera module. During a factory focus operation, for example, focusing equipment rotates the lens unit with respect to the housing, which adjusts the distance between the lens unit and the image capture device. When the lens unit is properly focused, it is fixed in position with respect to the housing with an adhesive, a thermal weld, or the like.

Although camera modules that are focused via thread sets provide for relatively accurate focal adjustments, they still have disadvantages. For example, as the lens unit is rotated within the housing, sliding friction between threads creates particulate debris that could easily contaminate the image sensor and/or other optical components (e.g., infra-red filters, protective covers, other lenses, etc.). Consequently, these contaminants accumulate and noticeably degrade the quality of images captured by, for example, blocking light to the image sensor.

It should be noted that although threaded components are used here as an example, other types of focusing components can similarly produce particulate debris that reduces the quality of the captured images. For example, U.S. Pat. No. 6,426,839 issued to Dou et al. discloses a camera module including a plurality of ramps formed directly on a stationary lens located inside the camera module. A rotatable lens carrier (having a separate lens) includes a plurality of legs that engage the ramped surfaces of the stationary lens. Rotating the lens carrier causes the legs of the lens carrier to move up or down the ramped surfaces of the lens, thereby moving the second lens closer to or further from the stationary lens, depending on the direction of rotation. Because the legs of the lens carrier slide over the ramped surfaces of the stationary lens, particulate debris can still be produced and collect on the imaging components of the camera module.

In addition to particulate debris produced by friction, ramped housings are also susceptible to other contaminants. For example, adhesives used to fix lens units to housings can easily run down into the camera module and contaminate the imaging components. Ramped modules are particularly susceptible to fluid contamination because the interface between the lens unit and the housing is typically not as tight as that of threaded camera modules. Generally, the walls of the lens unit and the housing are smooth, as opposed to having threads formed thereon. In addition to providing a path for contaminant entry, the loose fit between the lens unit and the housing can allow the lens barrel to fall out of the housing during steps of the manufacturing process that occur prior to fixing the lens unit to the housing, thereby reducing yield.

In efforts to minimize the accumulation of such contaminants, manufacturers have employed contaminant collecting surfaces within camera modules. For example, U.S. 2006/0103953 (Lee et al.) discloses a camera module that includes a particle collecting groove defined within the housing. In particular, the groove is formed around the peripheral surface of the light receiving aperture of the housing. The groove collects some the debris before it can reach the image sensor or other optical components within the camera module.

Although the groove formed on the camera module disclosed in U.S.2006/0103953 reduces the amount of debris that collects on the image sensor, there are still some disadvantages. For example, debris is still free to move out of the groove because the groove is not entirely isolated. Further, it is unlikely that the camera module will remain upright during use, thus debris is free to fall back out of the groove and obstruct the image sensor and/or optics.

What is needed, therefore, is a camera module design that minimizes the contamination of optical components during assembly and focusing processes. What is also needed is a camera module design that isolates contaminants before they collect on components within the camera module.

SUMMARY

The present invention overcomes the problems associated with the prior art by providing a camera module that includes a contaminant trap for collecting any contaminants that enter the camera module.

According to an example embodiment of the invention, a camera module includes an image capture device, a lens unit, a housing, and a boot disposed between the lens unit and the housing. The body of the lens unit extends perpendicularly with respect to an image capture surface of the image capture device (e.g., along an optical axis of the lens unit). The housing includes a mounting portion coupled to the image capture device and a receiving portion including an opening to receive the lens unit. The boot has a first end coupled to the lens unit and a second end coupled to the housing. Each end of the boot includes an inner and outer surface. The outer surfaces of the ends of the boot each have perimeters that form at least a portion of a particle trap. In one embodiment, the outer perimeter of one end of the boot is different (e.g., larger, smaller, shaped differently, etc.) than the outer perimeter of the other end of the boot. Alternatively, in at least one disclosed embodiment, the outer perimeters of the ends of the boot are the same size, such that the boot is a cylindrical tube with a uniform outer perimeter. In an example embodiment, the boot is formed from a resilient material and is shaped as an annulus.

The boot and the receiving portion of the housing function together as a means of limiting contaminants that might otherwise reach the image capture surface of the image capture device. The receiver portion of the housing includes a first inner surface and a second inner surface. The inner perimeter of the first inner surface is smaller than the perimeter of the second inner surface, with the first inner surface being disposed between the second inner surface and the image capture device. The boot extends from a position surrounded by the first inner surface of the housing to a position surrounded by the second inner surface of the housing. For example, in some embodiments, the boot extends past the end (e.g., bottom surface) of the lens unit, so that at least a portion of the inner surface of the second end of the boot is spaced apart from the lens unit (e.g., closer to the image capture device). A contaminant collection surface (e.g., a ledge with a V-shaped channel) joins the first inner surface and the second inner surface. The outer surface of the second end of the boot engages (e.g., slidably abuts) the first inner surface of the opening in the housing. The second end of the boot remains in contact with the first inner surface of the housing is moved with respect to the image capture device (e.g., along the optical axis during a focus operation). The contact between the second end of the boot and the first inner surface of the housing reduces the passage of contaminants between the lens unit and the housing to the image capture device.

The first end of the boot contacts the lens unit. For example, the boot can be stretched over the end of the lens unit so as to remain in place via frictional engagement. Optionally, the first end of the boot can be fixed to the lens unit with an adhesive or a mechanical attachment device. Alternatively, the boot can be fixed to the housing and slidably contact the lens unit, but this approach may be less effective at reducing contamination of the image capture device.

In an example embodiment, the receiver portion of the housing includes a first cylindrical wall and a second cylindrical wall, which are coaxial. The first cylindrical wall has an inner diameter that is smaller than the inner diameter of the second cylindrical wall and is disposed closer to the image capture device than the second cylindrical wall. The second end of the boot is coupled to the housing by an exterior surface of the second end of the boot slidably engaging the first cylindrical wall. The top edge of the first cylindrical wall is joined to the bottom edge of the second cylindrical wall by a ledge, which serves as a particle trap. In a particular embodiment, the ledge defines a channel that enhances its functionality as a particle trap.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art by providing a digital camera module including a boot disposed between the lens unit and the housing, so as to reduce contaminants entering the camera module, which might degrade the quality of images captured. In the following description, numerous specific details are set forth (e.g., particular examples of focus devices, substrate types, attachment devices, etc.) in order to provide a thorough understanding of the invention. Those skilled in the art will recognize, however, that the invention may be practiced apart from these specific details. In other instances, details of well known camera module manufacturing practices (e.g., automated focus processes, materials selection, molding processes, etc.) and components (e.g., electronic circuitry, device interfaces, etc.) have been omitted, so as not to unnecessarily obscure the present invention.

Figure 1:
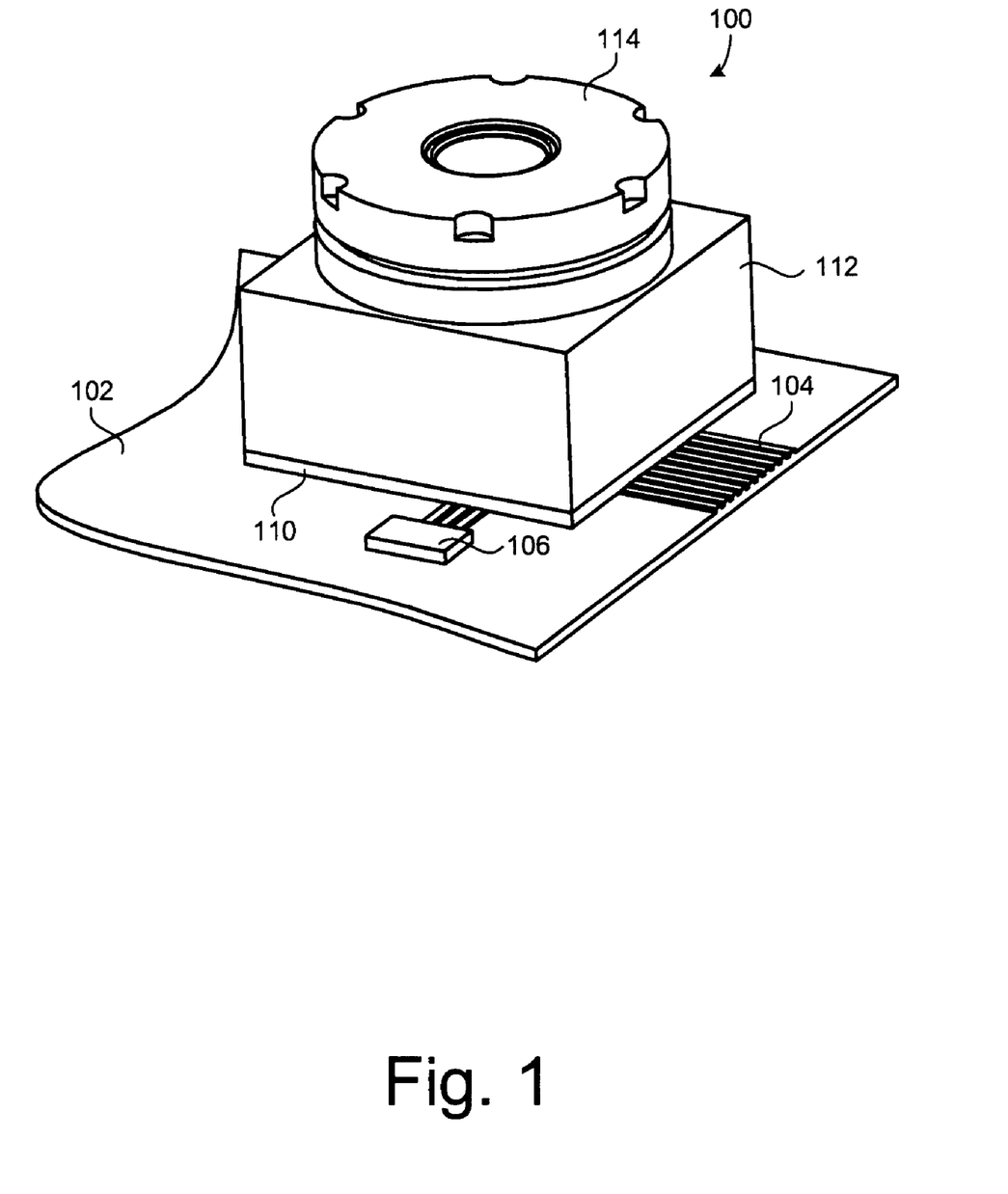
FIG. 1 is a perspective view of a camera module according to one embodiment of the present invention.

FIG. 1 is a perspective view of a camera module 100 according to one embodiment of the present invention. Camera module 100 is shown mounted on a portion of a printed circuit board (PCB) 102 that represents a PCB of a camera hosting device. Camera module 100 communicates electronically with other components of the hosting device via a plurality of conductive traces 104. Device 106 represents an electronic component (e.g., passive device, etc.) that may be mounted directly on PCB 102. Those skilled in the art will recognize that the particular design of PCB 102 will depend on the particular application, and is not particularly relevant to the present invention. Therefore, PCB 102, traces 104, and device 106 are representational in character only.

Camera module 100 includes an image capture device 108 (not visible in the view of FIG. 1), a circuit substrate 110, a housing 112, and a lens unit 114. Circuit substrate 110 is mounted to one end (e.g., the bottom) of housing 112 and lens unit 114 is mounted to the other end (e.g., the top) of housing 112. Image capture device 108 (FIG. 2) is mounted on the top surface of circuit substrate 110, so as to position image capture device 108 between substrate 110 and housing 112.

Figure 2:
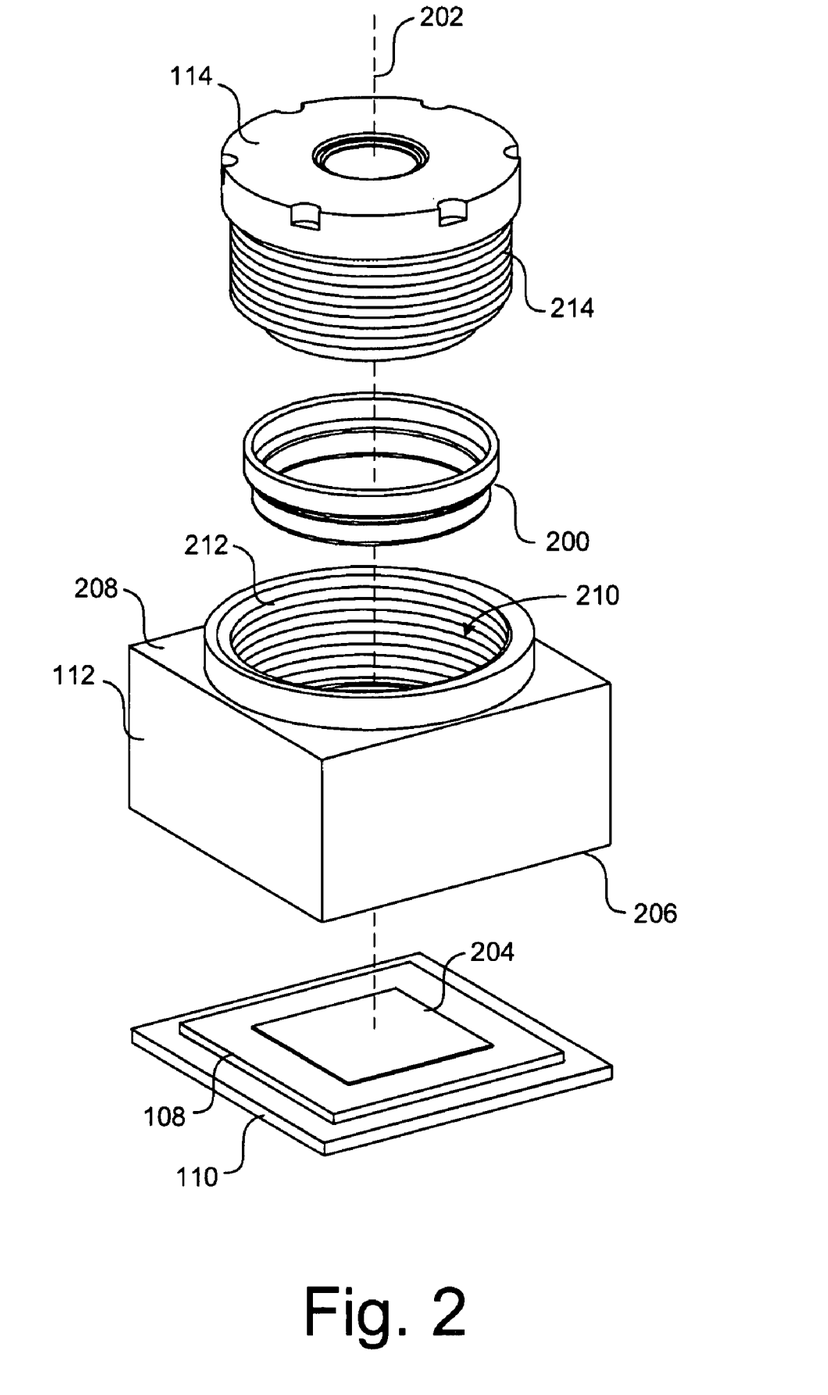
FIG. 2 is a partially exploded, perspective view of the camera module of FIG. 1.

FIG. 2 is a partially exploded view of camera module 100, showing some additional details not visible in the view of FIG. 1. In this particular embodiment, camera module 100 further includes a boot 200 disposed between housing 112 and lens unit 114. Note that the components of camera module 100 are aligned along an optical axis 202. In particular, housing 112, boot 200, and lens unit 114 are coaxial with respect to optical axis 202. Additionally, image capture device 108 includes an image capture surface 204 that is perpendicularly centered with respect to optical axis 202. Proper optical alignment of lens unit 114 with respect to image capture surface 204 facilitates proper focusing of images onto image capture surface 204.

Image capture surface 204 provides a substantially flat planar surface whereon images are focused and converted into electrical data that is processed by the processing circuitry of image capture device 108 and/or the host device. Data communication between image capture device 108 and substrate 110 can be achieved by any suitable means known to those skilled in the art. For example, image capture device 108 can include a set of contact pads electrically coupled to a complementary set of contact pads of substrate 110 via wire bonding, soldering, or the like. Image capture device 108 can be fixed to substrate 110 by any suitable means known to those skilled in the art (e.g., adhesive). Alternatively, camera module 100 can be assembled without substrate 110 by coupling image capture device 108 directly to housing 112.

Housing 112 includes a mounting portion 206 and a receiver portion 208. Mounting portion 206 is adapted to mount to substrate 110 so as to enclose image capture device 108 between substrate 110 and housing 112. Receiver portion 208 includes an opening 210 that receives lens unit 114. Opening 210 defines a set of threads 212 formed to engage a complementary set of threads 214 formed on lens unit 114 so as to facilitate the focusing of camera module 100. In particular, rotating lens unit 114 in a clockwise direction raises lens unit 114 with respect to housing 112, thereby increasing the distance between lens unit 114 and image capture surface 204. Conversely, rotating lens unit 114 in a counter-clockwise direction lowers lens unit 114 with respect to housing 112, thereby decreasing the distance between lens unit 114 and image capture surface 204. Thus, an image focused by lens unit 114 can be properly adjusted to lie in the focal plane of image capture surface 204. After lens unit 114 is positioned correctly, lens unit 114 is fixed with respect to housing 112 by some suitable means (e.g., adhesive, thermal weld, etc.).

Figure 3:
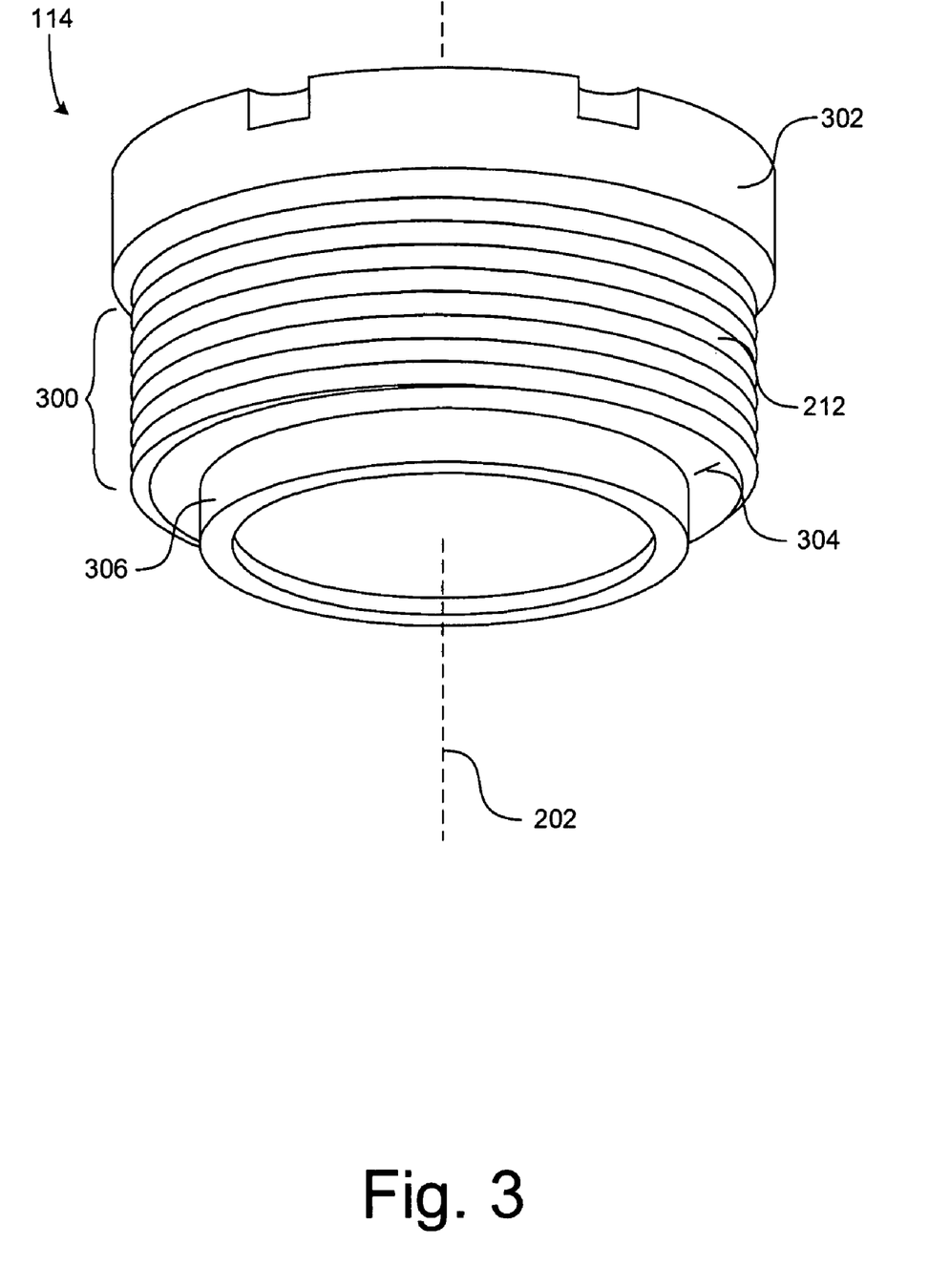
FIG. 3 is a bottom perspective view of the lens unit of FIG. 2.

FIG. 3 shows is a bottom perspective view of lens unit 114, showing additional features not visible in previously described figures. Lens unit 114 includes a body 300, a flange 302, and a lower end 304. Body 300 extends along optical axis 202 and is functional to carry the optical components (not shown) of lens unit 114. Flange 302 provides a surface for a user and/or machine (e.g., automatic focusing machines) to engage during the focusing of camera module 100. Lower end 304 includes a cylindrical portion 306 adapted to engage boot 200.

Figure 4:
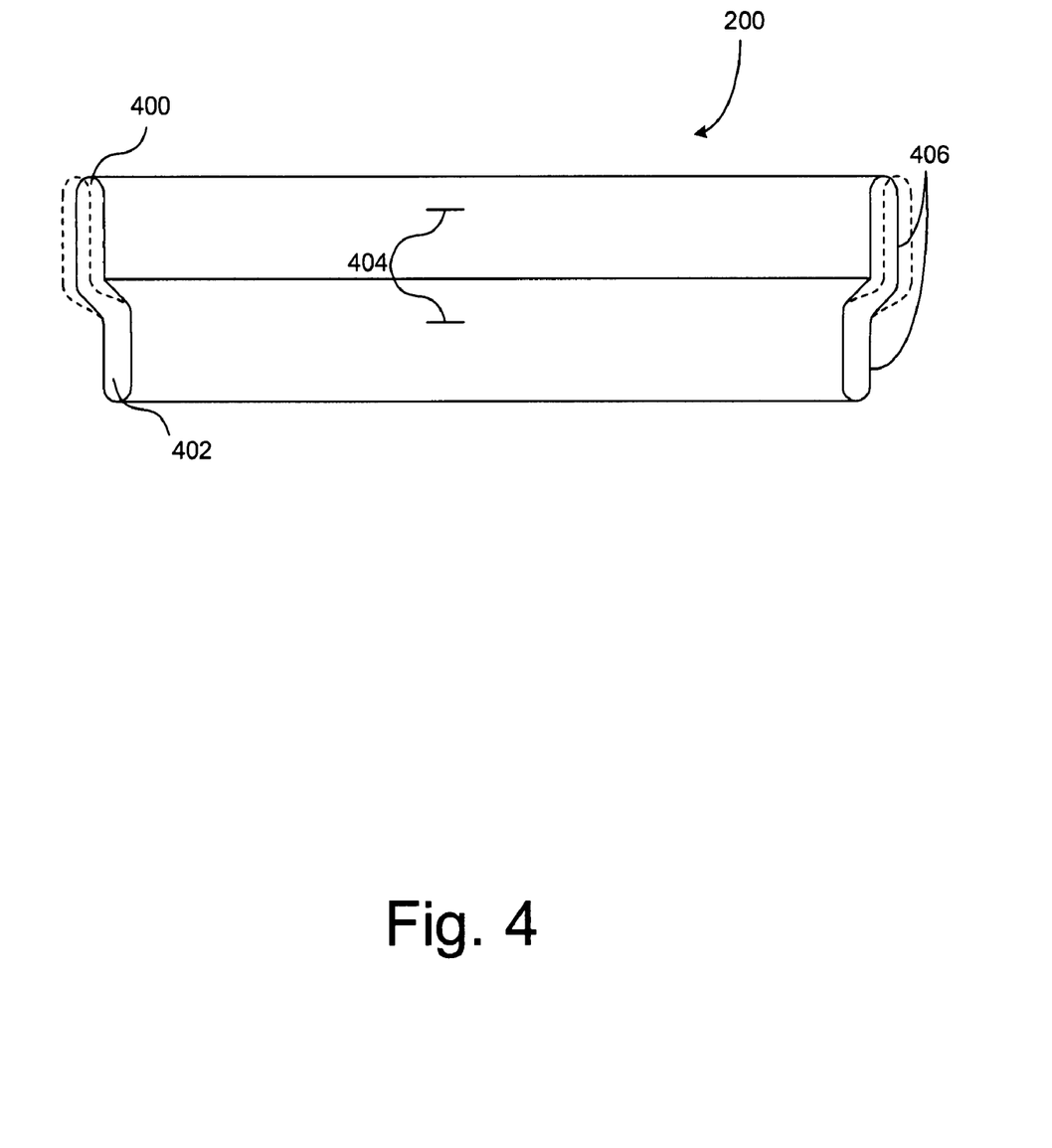
FIG. 4 is cross-sectional view of the boot of FIG. 2.

FIG. 4 shows a cross-sectional side view of boot 200. Boot 200 is a resilient annular-shaped element, which forms a seal for preventing contaminants from reaching image capture device 108. Boot 200 includes an upper end 400, a lower end 402, an inner surface 404, and an outer surface 406. Upper end 400 and inner surface 404 of boot 200 receive cylindrical portion 306 of lens unit 114 (FIG. 3). Lower end 402 and outer surface 406 of boot 200 engage the inner surface of housing 112, which will be described below in greater detail with reference to FIG. 5. Before boot 200 is flexed outward and coupled to lens unit 114, the perimeter of inner surface 404 of upper end 400 is slightly less than the outer perimeter of cylindrical portion 306 of lens unit 114. Therefore, the elastic retraction force of upper end 400 is sufficient to fix boot 200 to cylindrical portion 306 of lens unit 114.

Figure 5:
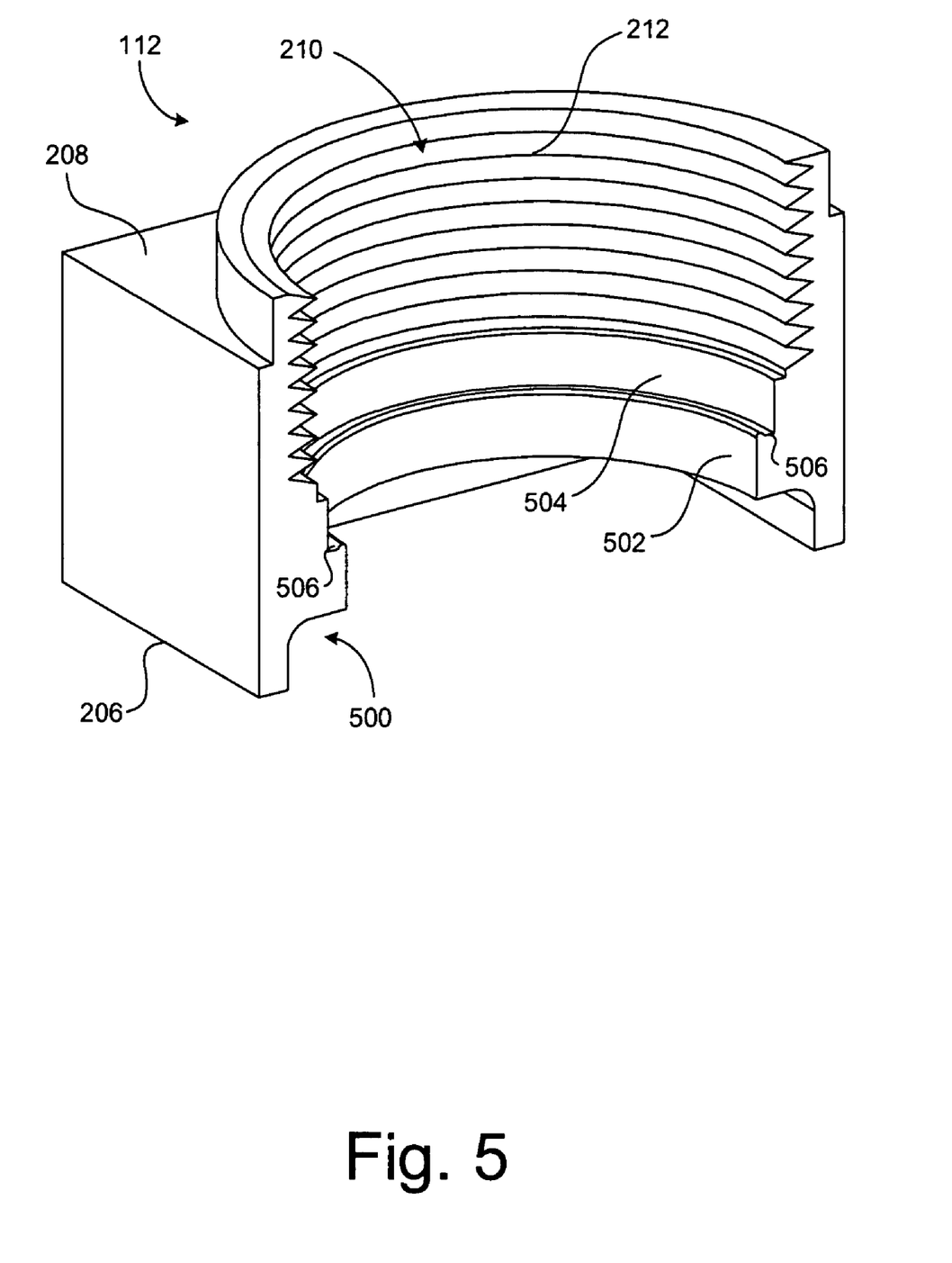
FIG. 5 is a cross-sectional perspective view of the housing of FIG. 2.
Figure 6A:
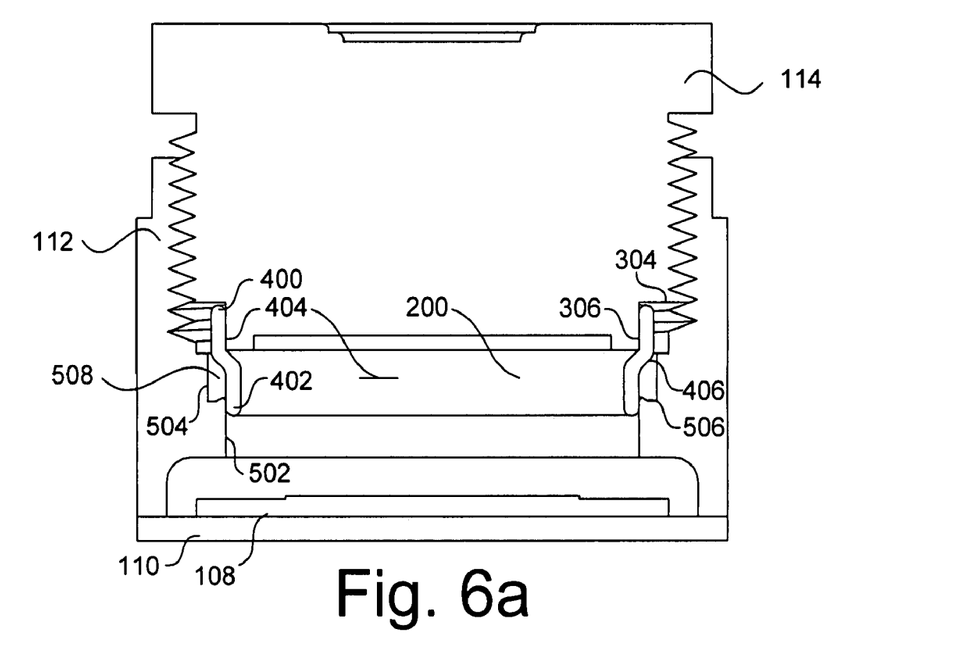
FIG. 6a is a cross-sectional side view of the camera module of FIG. 1 in a raised position.

FIG. 5 shows a cross-sectional view of housing 112 showing some additional features not visible in previous figures. In particular, housing 112 includes a recess 500, a first inner surface 502, a second inner surface 504, and a channel 506. Recess 500 provides a space to receive image capture device 108. Inner surface 502 is contoured to engage outer surface 406 of boot 200 so as to prevent contaminants from entering recess 500. Inner surface 504 forms the outside wall of a contaminant trap 508 (FIG. 6). As shown, the perimeter of first inner surface 502 is smaller than the perimeter of second inner surface 504, such that surfaces 502 and 504 form a pair of concentric cylindrical walls. Channel 506 is formed in a ledge that connects the top edge of inner surface 502 with the bottom edge of surface 504, and is operative to collect any contaminants that move past thread set 212. Examples of such contaminants include dust and/or other particulate debris caused by frictional contact between thread set 212 and complementary thread set 214 of lens unit 114. Channel 506 can also trap excess adhesive that is used to fix lens unit 114 to housing 112 during focusing processes.

FIG. 6a is a cross-sectional view of assembled lens module 100 in a raised position. In this particular embodiment, boot 200 is disposed between lens unit 114 and housing 112. In particular, inner surface 404 of upper end 400 of boot 200 engages cylindrical portion 306 of lens unit 114, and outer surface 406 of lower end 402 slidably contacts inner surface 502 of housing 112. Together, boot 200, inner surfaces 502, 504 and channel 506 form contaminant trap 508 which, as described above, collects and isolates any contaminants that advance past threads 212 and threads 214. Note that contaminant trap 508 is an isolated space enclosed by inner surface 504 of housing 112, outer surface 406 of boot 200, channel 506 of housing 112, and lower end 304 of lens unit 114.

Figure 6B:
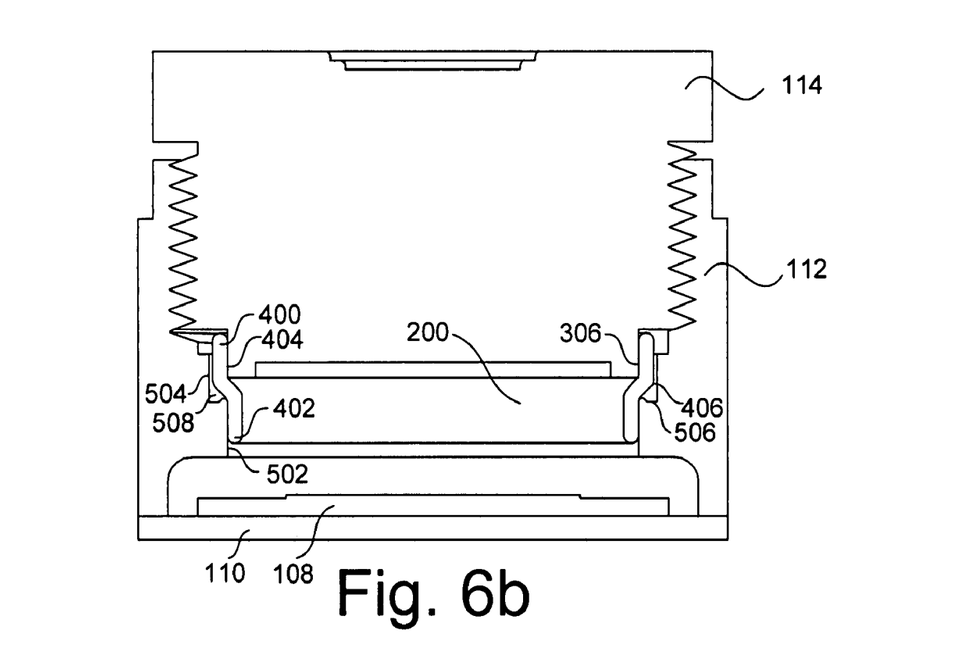
FIG. 6b is a cross-sectional side view of the camera module of FIG. 1 in a lowered position.

FIG. 6b is a cross-sectional view of assembled lens module 100 in a lowered position. As lens unit 114 is displaced downward towards image capture device 108, outer surface 406 of boot 200 slides within inner surface 502, while inner surface 404 of upper end 400 remains fixed to cylindrical portion 306 of lens unit 114. Alternatively, outer surface 406 can remain fixed to inner surface 502 while cylindrical portion 306 of lens unit 114 slides within inner surface 404 of boot 200.

Note that contaminant trap 508 remains sealed as lens unit 114 is moved up and down with respect to image capture device 108. In particular, the lower end 402 of boot 200 extends a sufficient distance past the bottom of lens unit 114 to remain in contact with inner surface 502 as lens unit 114 is moved up and down a predetermined distance required to achieve proper focus. Maintaining this contact during both rotational and translational movement of lens unit 114 and boot 200 is facilitated by the physical characteristics of boot 200. In particular, boot 200 is made from a soft, compressible material and is sized to fit into inner surface 502 under slight compression. Boot 200 then exerts a slight outward force and, thereby, maintains contact with inner surface 502. The inventors have found that forming boot 200 from various materials including, but not limited to, rubber, polyurethane/PPU, silicone, polytetrafluoroethylene, and/or plastic, provides acceptable results.

Figure 7:
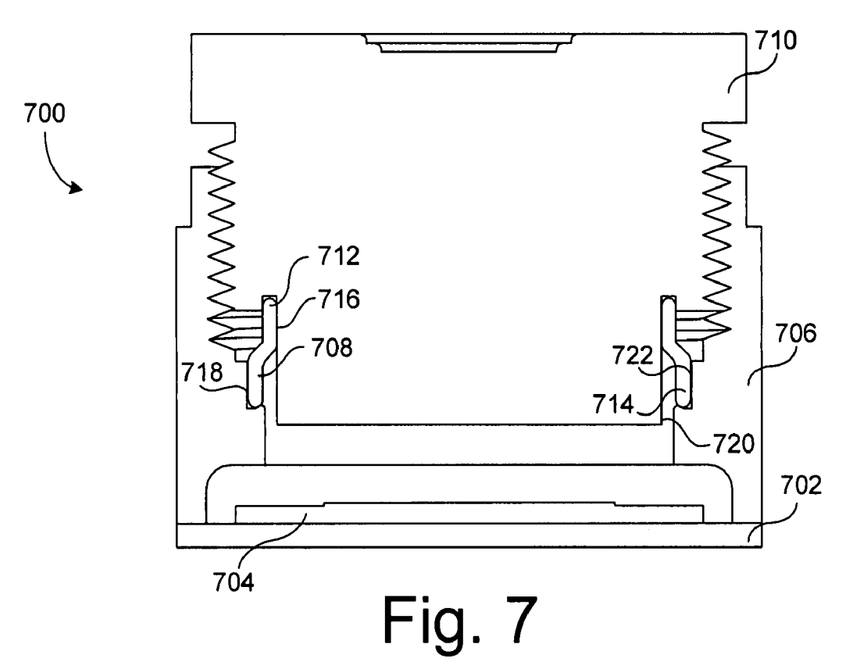
FIG. 7 is a cross-sectional side view of an alternate camera module according to another embodiment of the present invention.

FIG. 7 shows a cross-sectional view of an alternative camera module 700. Camera module 700 includes a circuit substrate 702, an image capture device 704, a housing 706, a boot 708, and a lens unit 710. Apart from the alternate sealing mechanism described below, the components of camera module 700 are substantially similar to the respective components of camera module 100.

Boot 708 includes an upper end 712, a lower end 714, an inner surface 716, and an outer surface 718. In this particular embodiment, the outer perimeter of upper end 712 is smaller than the outer perimeter of lower end 714. Upper end 712 and lower end 714 are coupled to lens unit 710 and housing 706, respectively. In particular, inner surface 716 contacts an outer cylindrical surface 720 of lens unit 710, while outer surface 718 of boot 708 contacts an inner cylindrical surface 722 of housing 706. In this embodiment, boot 708 is fixed with respect to lens unit 710 and slidably engages housing 706. Alternatively, boot 708 can be fixed with respect to housing 706 and slidably engage lens unit 710.

Figure 8:
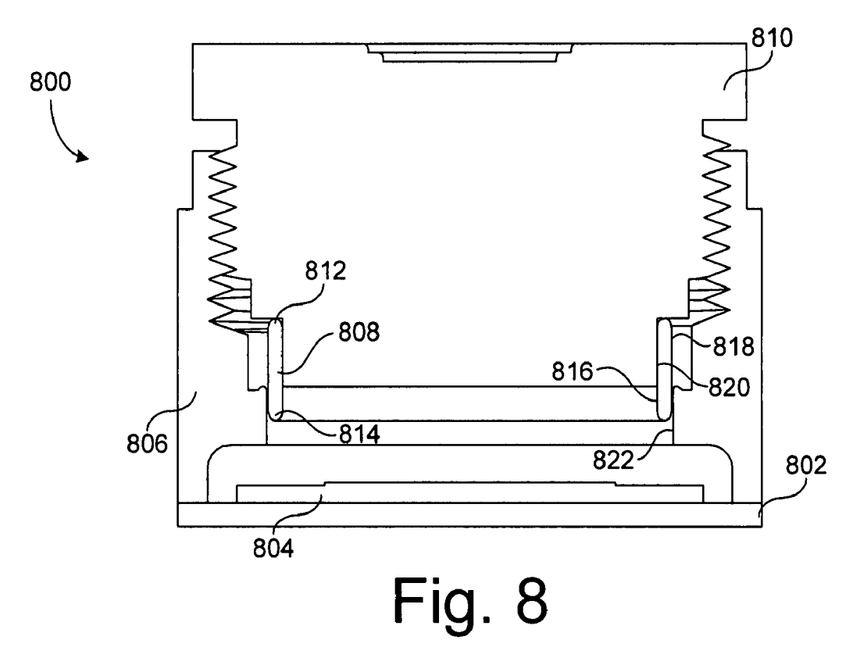
FIG. 8 is a cross-sectional side view of another alternate camera module according to yet another embodiment of the present invention.

FIG. 8 shows a cross-sectional view of yet another alternative camera module 800. Camera module 800 includes a circuit substrate 802, an image capture device 804, a housing 806, a boot 808, and a lens unit 810. Apart from the alternate sealing mechanism described below, the components of camera module 800 are substantially similar to the respective components of camera module 100.

In this particular embodiment, boot 808 is a resilient cylindrical tube having an approximately uniform outer perimeter along its length. Boot 808 includes an upper end 812, a lower end 814, an inner surface 816, and an outer surface 818. As shown, the outer perimeter of boot 808 is uniform from upper end 812 to lower end 814. Upper end 812 of boot 808 is coupled to lens unit 810 and lower end 814 is coupled to housing 806. In particular, inner surface 816 of boot 808 contacts an outer cylindrical surface 820 of lens unit 810 while outer surface 818 of boot 808 contacts an inner cylindrical surface 822 of housing 806. As lens unit 810 is displaced vertically with respect to image capture device 804, outer surface 818 and inner surface 816 of boot 808 remain in contact with inner cylindrical surface 822 and outer cylindrical surface 820, respectively. As in the previous embodiment, boot 808 can be fixed to either lens unit 810 or housing 806. However, the inventors expect superior results will be achieved by fixing boot 808 to the lower end of lens unit 810.

The description of particular embodiments of the present invention is now complete. Many of the described features may be substituted, altered or omitted without departing from the scope of the invention. For example, alternate focus mechanisms (e.g., complementary opposing ramps on lens unit 114 and the top of housing 112) may be substituted for those described above. Indeed, the inventors believe that the combination of the contamination reduction features described herein with such alternate focus mechanisms will provide a significant improvement over the devices of the prior art. As another example, alternate materials can be used to form the boot, depending on the particular application. These and other deviations from the particular embodiments shown will be apparent to those skilled in the art, particularly in view of the foregoing disclosure.

We claim:

1. A camera module comprising:
   an image capture device including an image capture surface;
   a lens unit including a body extending perpendicularly with respect to said image capture surface of said image capture device;
   a housing including a mounting portion coupled to said image capture device and a receiver portion including an opening to receive said lens unit; and
   a boot disposed between said lens unit and said housing, said boot including a first end coupled to said lens unit, a second end coupled to said housing, a first inner surface proximate said first end, a first outer surface proximate said first end, a second inner surface proximate said second end, and a second outer surface proximate said second end, a perimeter of said first outer surface of said boot being different than a perimeter of said second outer surface of said boot; and wherein
   said opening of said receiver portion of said housing is defined by a first inner surface of said housing having a first inner perimeter and a second inner surface of said housing having a second inner perimeter;
   said first inner perimeter is smaller than said second inner perimeter;
   said first inner surface is disposed between said second inner surface and said image capture device; and
   said boot extends from a position surrounded by said first inner surface of said housing to a position surrounded by said second inner surface of said housing.

2. A camera module according to claim 1, wherein:
   said boot is formed from a resilient material; and
   said boot is shaped as an annulus.

3. A camera module according to claim 1, wherein said first inner surface of said housing and said second inner surface of said housing are joined by a contaminant collection surface.

4. A camera module according to claim 3, wherein said contaminant collection surface defines a channel.

5. A camera module according to claim 1, wherein the perimeter of said first outer surface of said boot is larger than the perimeter of said second outer surface of said boot.

6. A camera module according to claim 5, wherein said second outer surface of said boot engages said first inner surface of said opening of said housing.

7. A camera module according to claim 6, wherein said second outer surface of said boot slidably contacts said first inner surface of said housing, said second outer surface of said boot remaining in contact with said first inner surface of said housing when said lens unit is moved a predetermined distance along an axis perpendicular to said image capture surface, thereby reducing the passage of contaminants between said lens unit and said first surface of said opening.

8. A camera module according to claim 6, wherein said first inner surface of said boot contacts said lens unit.

9. A camera module according to claim 8, wherein said first inner surface of said boot frictionally engages said lens unit.

10. A camera module according to claim 8, wherein said first inner surface of said boot slidably contacts said lens unit.

11. A camera module according to claim 1, wherein at least a portion of said second inner surface of said boot is spaced apart from said lens unit.

12. A camera module according to claim 1, wherein the perimeter of said first outer surface of said boot is smaller than the perimeter of said second outer surface of said boot.

13. A camera module comprising:
   an image capture device including an image capture surface;
   a lens unit including a body extending perpendicularly with respect to said image capture surface of said image capture device, said body having a first surface having a first outer perimeter parallel to said image capture surface;
   a housing including a mounting portion coupled to said image capture device and a receiver portion coupled to said lens unit; and
   a boot disposed between said lens unit and said housing, said boot including a first end coupled to said lens unit, a second end coupled to said housing, a first interior surface adjacent said first end, and a second interior surface adjacent said second end, at least a portion of said second interior surface being spaced apart from said lens unit; and wherein
   said receiver portion of said housing includes an opening defined by a first inner surface of said housing and a second inner surface of said housing;
   an inner perimeter of said first inner surface is smaller than an inner perimeter of said second inner surface;
   said first inner surface is disposed between said second inner surface and said image capture device; and
   said boot extends from a position surrounded by said first inner surface to a position surrounded by said second inner surface of said housing.

14. A camera module according to claim 13, wherein an outer perimeter of said first end of said boot is smaller than an outer perimeter of said second end of boot.

15. A camera module according to claim 13, wherein an outer perimeter of said first end of said boot is larger than an outer perimeter of said second end of boot.

16. A camera module according to claim 13, wherein said boot is a cylindrical tube with a uniform outer perimeter.

17. A camera module according to claim 13, wherein:
said lens unit further includes a bottom surface; and
said boot extends beyond said bottom surface of said lens unit to a position closer to said image capture device than said bottom surface of said lens unit.

18. A camera module according to claim 13, wherein said first inner surface of said opening and said second inner surface of said opening are joined by a contaminant collection surface.

19. A camera module according to claim 18, wherein said contaminant collecting surface defines a channel.

20. A camera module according to claim 13, wherein said second end of said boot further includes an outer surface which slidably contacts said first inner surface of said housing, said outer surface of said second end of said boot remaining in contact with said first surface of said housing when said lens unit is moved a predetermined distance along an axis perpendicular to said image capture surface.

21. A camera module according to claim 13, wherein:
said receiver portion of said housing includes a first cylindrical wall;
said receiver portion of said housing includes a second cylindrical wall;
said first cylindrical wall is coaxial with said second cylindrical wall;
said first cylindrical wall has a diameter that is smaller than a diameter of said second cylindrical wall;
said first cylindrical wall is disposed closer to said image capture device than said second cylindrical wall;
said boot includes an exterior surface around said second end of said boot; and
said second end of said boot is coupled to said housing by said exterior surface around said second end of said boot slidably engaging said first cylindrical wall.

22. A camera comprising:
an image capture device with an image capture surface;
a lens unit including a body extending toward said image capture surface of said image capture device;
a housing coupled to said image capture device, said housing including a receiver portion having an opening to receive said lens unit, said opening being defined by a first inner surface of said housing and a second inner surface of said housing, said first inner surface of said housing having a first inner perimeter, said second inner surface of said housing having a second inner perimeter, said first inner perimeter being smaller than said second inner perimeter, said first inner surface being closer to said image capture device than said second inner surface; and
a boot disposed between said lens unit and said housing, said boot including a first end coupled to said lens unit and a second end coupled to said housing, said boot extending from a position surrounded by said first inner surface of said housing to a position surrounded by said second inner surface of said housing.

23. A camera according to claim 22, wherein:
said first inner surface and said second inner surface are coaxial cylindrical surfaces; and
a top edge of said first inner surface is joined to a bottom edge of said second inner surface by a ledge.

24. A camera according to claim 23, wherein said ledge defines a channel.

25. A camera according to claim 23, wherein:
said first end of said boot is fixed to said lens unit; and
an outer surface of said second end of said boot slidably abuts said second inner surface of said housing.

26. A camera module comprising:
an image capture device including an image capture surface;
a lens unit including a body extending perpendicularly with respect to said image capture surface of said image capture device, said body having a first surface having a first outer perimeter parallel to said image capture surface;
a housing including a mounting portion coupled to said image capture device and a receiver portion coupled to said lens unit; and
a boot disposed between said lens unit and said housing, said boot including a first end coupled to said lens unit, a second end coupled to said housing, a first interior surface adjacent said first end, and a second interior surface adjacent said second end, at least a portion of said second interior surface being spaced apart from said lens unit; and wherein
an outer perimeter of said first end of said boot is smaller than an outer perimeter of said second end of boot.

27. A camera module according to claim 26, wherein:
said lens unit further includes a bottom surface; and
said boot extends beyond said bottom surface of said lens unit to a position closer to said image capture device than said bottom surface of said lens unit.

28. A camera module according to claim 26, wherein:
said receiver portion of said housing includes an opening defined by a first inner surface of said housing and a second inner surface of said housing;
an inner perimeter of said first inner surface is smaller than an inner perimeter of said second inner surface;
said first inner surface is disposed between said second inner surface and said image capture device;
said boot extends from a position surrounded by said first inner surface to a position surrounded by said second inner surface of said housing; and
said first inner surface of said opening and said second inner surface of said opening are joined by a contaminant collection surface.

29. A camera module according to claim 28, wherein said contaminant collecting surface defines a channel.

30. A camera module according to claim 26, wherein:
said receiver portion of said housing includes an opening defined by a first inner surface of said housing and a second inner surface of said housing;
an inner perimeter of said first inner surface is smaller than an inner perimeter of said second inner surface;
said first inner surface is disposed between said second inner surface and said image capture device;
said boot extends from a position surrounded by said first inner surface to a position surrounded by said second inner surface of said housing; and
said second end of said boot further includes an outer surface which slidably contacts said first inner surface of said housing, said outer surface of said second end of said boot remaining in contact with said first surface of said housing when said lens unit is moved a predetermined distance along an axis perpendicular to said image capture surface.

31. A camera module according to claim 26, wherein:
said receiver portion of said housing includes a first cylindrical wall;
said receiver portion of said housing includes a second cylindrical wall;
said first cylindrical wall is coaxial with said second cylindrical wall;
said first cylindrical wall has a diameter that is smaller than a diameter of said second cylindrical wall;
said first cylindrical wall is disposed closer to said image capture device than said second cylindrical wall;
said boot includes an exterior surface around said second end of said boot; and
said second end of said boot is coupled to said housing by said exterior surface around said second end of said boot slidably engaging said first cylindrical wall.

32. A camera module comprising:
an image capture device including an image capture surface;
a lens unit including a body extending perpendicularly with respect to said image capture surface of said image capture device, said body having a first surface having a first outer perimeter parallel to said image capture surface;
a housing including a mounting portion coupled to said image capture device and a receiver portion coupled to said lens unit; and
a boot disposed between said lens unit and said housing, said boot including a first end coupled to said lens unit, a second end coupled to said housing, a first interior surface adjacent said first end, and a second interior surface adjacent said second end, at least a portion of said second interior surface being spaced apart from said lens unit; and wherein
said receiver portion of said housing includes a first cylindrical wall;
said receiver portion of said housing includes a second cylindrical wall;
said first cylindrical wall is coaxial with said second cylindrical wall;
said first cylindrical wall has a diameter that is smaller than a diameter of said second cylindrical wall;
said first cylindrical wall is disposed closer to said image capture device than said second cylindrical wall;
said boot includes an exterior surface around said second end of said boot; and
said second end of said boot is coupled to said housing by said exterior surface around said second end of said boot slidably engaging said first cylindrical wall.

33. A camera module according to claim 32, wherein an outer perimeter of said first end of said boot is larger than an outer perimeter of said second end of boot.

34. A camera module according to claim 32, wherein said boot is a cylindrical tube with a uniform outer perimeter.

35. A camera module according to claim 32, wherein:
said lens unit further includes a bottom surface; and
said boot extends beyond said bottom surface of said lens unit to a position closer to said image capture device than said bottom surface of said lens unit.

36. A camera module according to claim 32, wherein:
said boot extends from a position surrounded by said first cylindrical wall to a position surrounded by said second cylindrical wall; and
said first cylindrical wall and said second cylindrical wall are joined by a contaminant collection surface.

37. A camera module according to claim 36, wherein said contaminant collecting surface defines a channel.

38. A camera module according to claim 32, wherein said exterior surface of said second end of said boot remains in contact with said first cylindrical wall of said housing when said lens unit is moved a predetermined distance along an axis perpendicular to said image capture surface.

* * * * *